United States Patent [19]

Schossow et al.

[11] 4,447,844
[45] May 8, 1984

[54] ELECTRICAL SAFETY SWITCH FOR ELECTRICAL APPLIANCES

[76] Inventors: George W. Schossow, 2316 Lilac La.; George P. Stallings, 2327 Mayfair Ave., both of White Bear Lake, Minn. 55110

[21] Appl. No.: 349,011

[22] Filed: Feb. 16, 1982

[51] Int. Cl.³ .............................................. H02H 3/14
[52] U.S. Cl. .......................................... 361/77; 361/1; 361/88; 361/50; 307/326
[58] Field of Search ....................... 361/77, 50, 49, 42, 361/47, 48, 1, 88; 307/326; 340/652, 660, 661, 649

[56] References Cited

U.S. PATENT DOCUMENTS

| 2,922,925 | 1/1960 | Gerrard | 361/77 X |
|---|---|---|---|
| 3,395,324 | 7/1968 | Rager, Jr. | 361/77 X |
| 3,588,603 | 6/1971 | Slugantz | 361/49 |
| 3,665,252 | 5/1972 | Rogers, Sr. et al. | 361/50 |
| 3,944,891 | 3/1976 | McDonald et al. | 361/77 |
| 4,028,594 | 6/1977 | Schossow | 361/77 X |

*Primary Examiner*—Patrick R. Salce
*Attorney, Agent, or Firm*—John C. Barnes

[57] ABSTRACT

An electrical safety switch for protecting an electrical appliance requiring a ground, an on/off switch disposed in series with a resistor and primary coil of a transformer between the ground line and the B+ line of the appliance, and a triac connected in series with the load of the appliance between the B+ line and the neutral line with the gate triggering the triac connected to the transformer to be energized thereby upon a current being present through the on/off switch.

5 Claims, 1 Drawing Figure

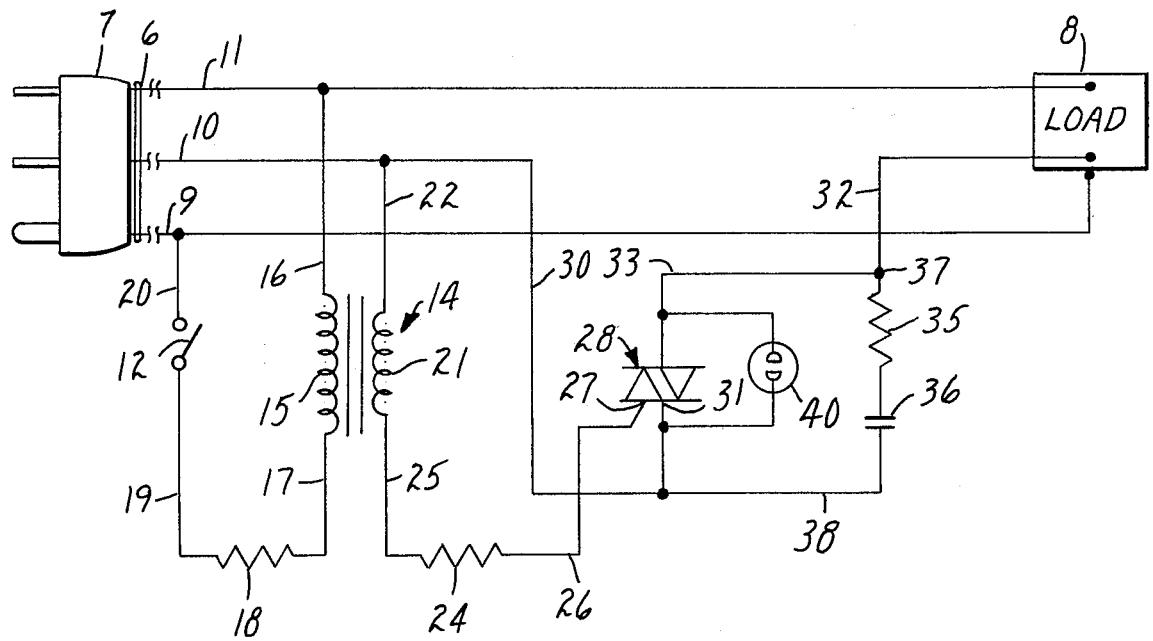

ELECTRICAL SAFETY SWITCH FOR ELECTRICAL APPLIANCES

DESCRIPTION

Technical Field

This invention relates to an improved circuit for electrical appliances, and in particular, to an improved electrical safety switch for appliances which will protect the operator in the event there is not a proper ground provided in the electrical outlet to which the appliance is connected.

Background Art

The grounded cord or the three-wire cord on electrical appliances was established for the protection of the operators against electrical shock while operating the appliance or handling the appliance. The need for the three-wire cord and the properly grounded electrical outlet which was established in the electrical code was meant to assure that the electrical outlet was properly wired and that the neutral receptacle wire of the cord is connected to the neutral wire at the outlet. Due to the fact however that a great many electrical outlets are improperly wired or that a fully ground line is provided which does not establish a proper ground line for the appliance it is necessary that the on-off switch to operate the appliance be provided with a safety circuit such that the appliance will not operate unless a ground is established to the appliance and unless the outlet is properly wired as to establish the proper earth ground, the proper position of the B+ line and the proper positioning of the neutral line at the electrical outlet.

One such protective switch is disclosed and illustrated in U.S. Pat. No. 4,028,594, issued June 7, 1977, to one of the inventors of the subject application. This earlier protective switch provided the assurance that the electrical outlet was properly wired and that a ground was provided to the electrical appliance before it could be energized. The device was designed to pass current through the ground line sufficient to energize a switching device or relay. Since ground fault protective devices were placed on the market for installation with the electrical outlet to protect operators of electrical appliances from hazardous electrical shocks it became necessary to not merely provide a solid state triggering device or switch but to reduce the amount of current applied to the ground line to a level considerably below that protected by a ground fault device. These ground fault protective devices were not triggered unless there was a minimum of five milliamps of current at 115 volts passing through the ground fault protective device causing the circuit to the electrical outlet to be opened and protect the operator. These systems are an aid to protection of the operators, but nonetheless, they subject the operators from time to time to needless electrical shocks which are uncomfortable and distracting to normal working procedures. They do not protect the operator from an improperly wired appliance.

The safety switch of the present invention insures the appliance and the outlet are wired properly, including earth ground, before the appliance will operate.

Due to the fact that the ground fault protective device would trip with the amount of current utilized to energize the device described in prior U.S. Pat. No. 4,028,594, the two devices could not function when utilized simultaneously in the same circuit. Both devices make valuable contributions to electrical safety and it would be advantageous to permit them to function in combination with each other. The present invention provides an improved safety switch which accomplishes this purpose and affords a second continuous monitoring of earth ground to the appliance.

This improved device functions well with one-fifth (or less) of the allowable current approved and deemed safe for the ground fault safety devices now on the market. Additionally, this improved device cannot be negated or by-passed for convenience by utilizing 2 wire adaptor plugs on 3 wire grounded appliance cords. To circumvent the safety of the improved device would necessitate disassembly of the safety protected appliance and revamping of the circuit. The ground fault interrupter turns off current to an electrical appliance when there is any current leaks, whereas the improved device does not allow the electrical appliance to turn on if there is not a proper earth ground circuit provided. The appliance will not operate if ground is not present and will cease to operate if ground is lost during operation.

The electrical protective switch of the present invention combines a transformer between the B+ line and the ground line such that if the operating switch is closed a very small monitoring current is applied to the ground line through one winding of a transformer and a voltage is applied to a triac such that a circuit is closed through the load of the appliance to energize the same and to carry the current load until the operating switch has been opened. A lamp on the appliance in circuit with the safety circuit will tell an operator, after the plug is placed in the outlet, that there is current in the outlet. If after the on/off switch is moved to the on position and the light stays on, the light shows there is not a proper ground to the appliance or the outlet is improperly wired, i.e., neutral and B+ is reversed in the outlet. The safety switch of the present invention does not place more than one milliamperes of current into the ground line such that it will not trip a ground fault system utilizing the five milliamperes of current.

DISCLOSURE OF THE INVENTION

An electric safety switch for use with appliances to assure that the appliance is properly connected to earth ground, the B+ line and the neutral line of an electrical outlet before it will operate. The electrical safety switch of the present invention comprises a primary transformer coil connected in circuit between the B+ line and the activating switch for the appliance and the ground line for the electrical circuit. A second coil for the transformer is connected between the neutral line and the gate of a triac to place the triac in conduction. The input and output gates of the triac are positioned between the neutral line and the load of the appliance which is also directly connected to the B+ line. Suitable resistors are established in the circuits of the primary and secondary windings of the transformer to reduce the current through the primary winding of the transformer to an amount not exceeding one milliampere.

BRIEF DESCRIPTION OF DRAWINGS

The drawing discloses a circuit diagram for the safety circuit of the present invention with the components disclosed by the common electrical symbols.

BEST MODE FOR CARRYING OUT THE INVENTION

The electric safety switch for installation in appliances according to the present invention is disposed in a three-wire cord 6, which cord, between the plug 7 and the load 8 of the appliance, has a ground line 9, the neutral line 10, and the B+ line 11.

The safety circuit for energizing the load 8 when the plug 7 is inserted in an electrical outlet which is properly wired allows current from the B+ line 11 to flow through the load 8 and back though the neutral line 10, maintaining the load energized until the subsequent opening of the on/off switch 12 connected to ground line 9. The electrical safety circuit of the present invention comprises a transformer generally designated 14 disposed with the primary winding 15 connected via lead 16 at one side to the B+ line 11 and connected via lead 17 through a resistor 18 to one side of the on/off switch 12 via lead 19 which is also connected to the ground line 9 via lead 20. The transformer 14 is preferably a Triad F-94X. The transformer 14 has an output coil 21 connected between the neutral line 10 via lead 22 to a resistor 24 via lead 25. The resistor 24 exceeds 1000 ohms and imposes a small voltage via lead 26 onto the gate 27 of a triac 28. The small voltage which has a maximum of about 2.5 volts of 3.0 milliamperes will trigger the triac such that the triac closes a circuit from B+ line 11 through the load 8 and conductor 32 and 33 to the primary of the triac and through the triac to the neutral line 10 via lines 31 and 30 to energize the load. The circuit is normally open due to the inherent characteristics of the triac. The parallel connection with the triac of a resistor 35 and a condensor 36 connected via leads 37 and 38 to the leads 32 and 30 reduces current surges when the triac turns on and insures correct operation of the triac.

A lamp 40 is also disposed in parallel with the triac such that the lamp 40 is on when the plug is in an outlet where power is available to the appliance and the triac is open indicating the switch is off or the proper ground is missing. If proper ground is available and the outlet is wired properly, closing switch 12 will cause the triac 28 to close and extinguish the lamp 40. The lamp is connected to leads 30 and 33.

The transformer circuit provides a very small monitoring current not exceeding 1 milliampere continuously through the ground line. This condition is afforded with the plug 7 establishing electrical contact in an outlet provided with 115 volts. If the earth ground is subsequently lost the appliance will shut off as the triac will open, interrupting the circuit to the load.

The representative values of the various components of the electrical safety switch as illustrated to afford less than 1 milliampere, e.g. 0.985 milliampere, in the monitoring circuit through the on/off switch is as follows:

| | |
|---|---|
| Switch 12 | Single pole, single throw |
| Transformer 14 | Triad F-94X |
| Resistor 18 | 116.8K ohms |
| Resistor 24 | 1600 ohms |
| Triac 28 | Motorola 2N6072B |
| Resistor 35 | 100 ohms |
| Condenser 36 | 0.1 Microfarads |

A circuit constructed as disclosed in the drawing with the components described can carry a maximum load of four amperes to the load 8 of the appliance. The load 8 will be the power plant for an appropriate appliance or the load 8 may be a secondary switching device when the appliance requires more than four amperes.

Having thus disclosed the invention with reference to a preferred embodiment it is to be understood that changes may be made to scale the same up or down in accordance with good engineering practice and will not detract from the scope of the invention as described in the appended claims.

We claim:

1. An electrical safety switch adapted for incorporation in an electrical appliance having a three-wire cord comprising
   an on/off switch connected directly to the ground line of the cord and disposed in series with a resistor and the primary coil of a transformer, which transformer is connected between the resistor and the B+line of the cord leading to the appliance,
   a triac connected between the load of the appliance and the neutral line with the gate triggering the triac being connected to the transformer secondary coil to be energized thereby upon a current being present through the on/off switch, and
   means for matching impedance in said circuit with said gate to the impedance of the circuit and said on/off switch for providing a low current across said on/off switch.

2. A safety switch according to claim 1 wherein said means matching said impedance comprises the secondary winding of the transformer, which is connected to the neutral line, and a resistor connected in series with said secondary winding and the gate of the triac.

3. A safety switch according to claim 1 wherein the sum of the resistance of said resistor and the primary coil of said transformer produce a current through said on/off switch and ground line of less than 5 milliamperes.

4. A safety switch according to claim 3 wherein said current through said on/off switch and ground line is less than 1 milliampere.

5. An electrical safety circuit for position between an electrical appliance and the plug of the 3-wire cord for monitoring the presence of a suitable ground for the appliance prior to the energization of the appliance with the total voltage and current load to operate the same comprising:
   means providing a direct B+ line from the plug to the appliance,
   an on/off switch positioned in a circuit between the B+ line and the ground line,
   triggering circuit means for carrying a low voltage signal,
   transformer means disposed in series with said switch for producing a signal into said triggering circuit means,
   means between said transformer means and said switch for reducing the voltage in said switch, and
   a triac connected in series with the load of the appliance between the B+ line and the neutral line triggered by said signal to energize the appliance through said triac upon current passing through said on/off switch.

* * * * *